May 7, 1957 D. G. RENNO 2,791,464
VEHICLE BODY DOOR STRUCTURE
Filed Jan. 4, 1954 4 Sheets-Sheet 1
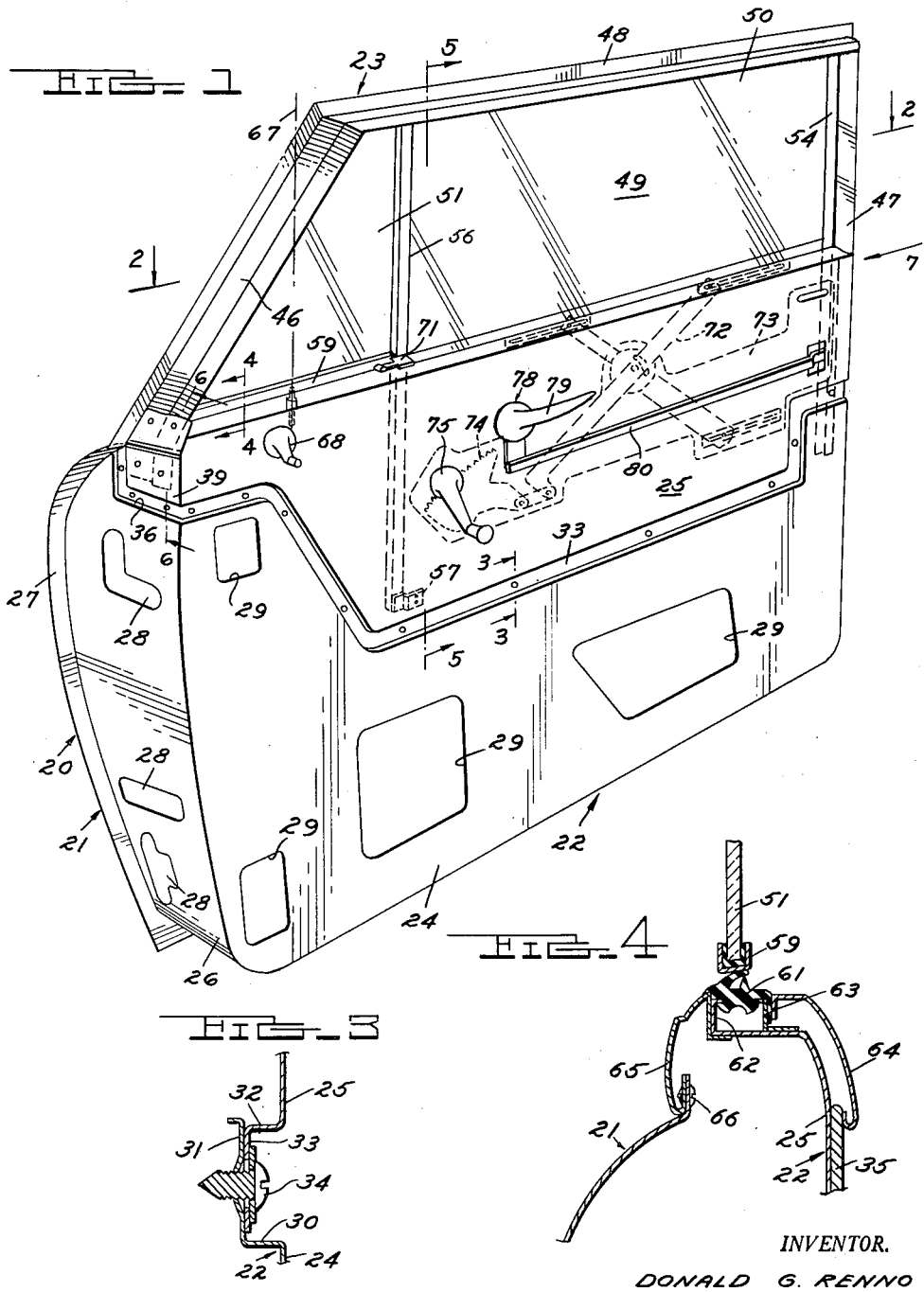
INVENTOR.
DONALD G. RENNO
BY
Whittemore, Hulbert & Belknap
ATTORNEYS May 7, 1957 D. G. RENNO 2,791,464
VEHICLE BODY DOOR STRUCTURE
Filed Jan. 4, 1954 4 Sheets-Sheet 2
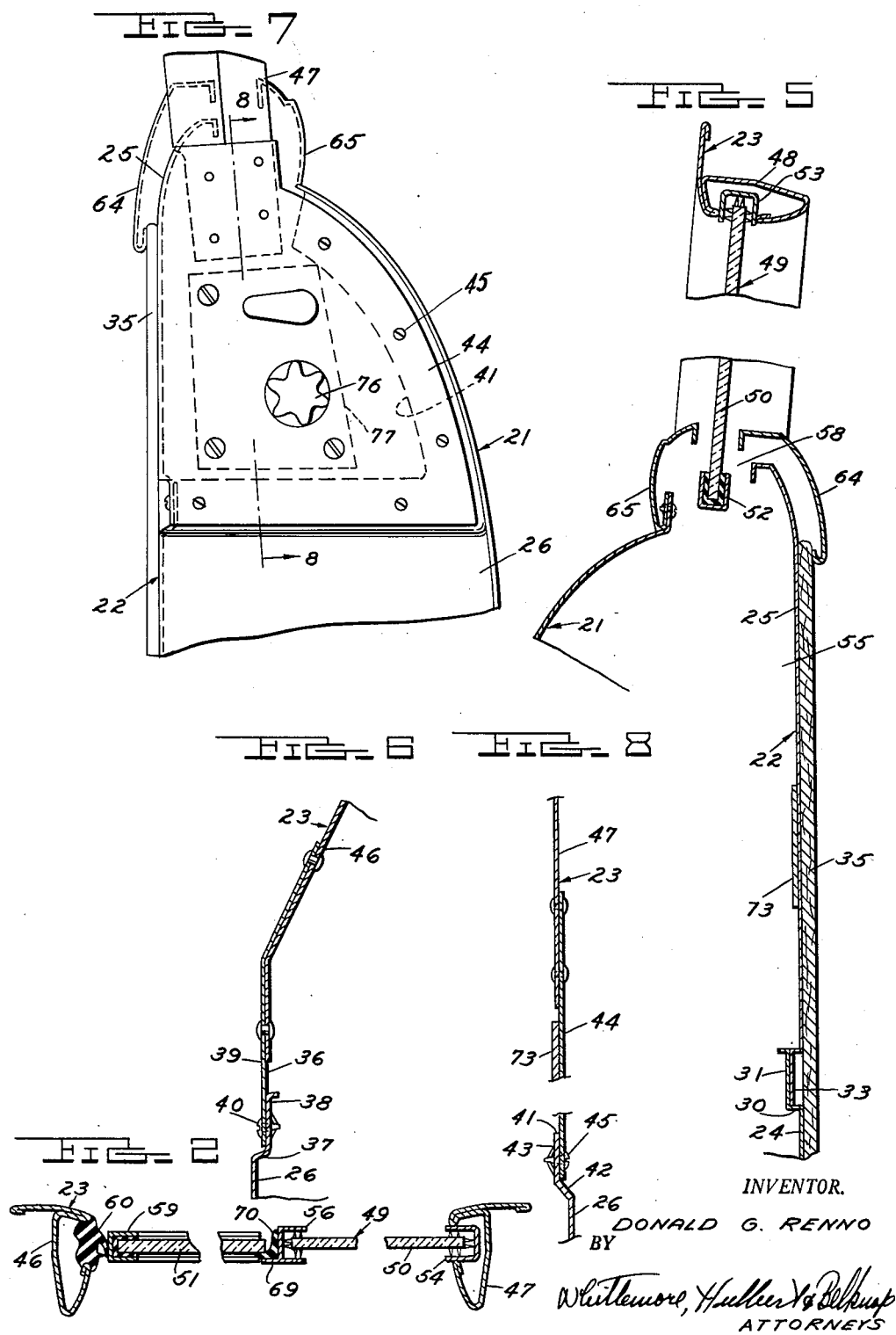

May 7, 1957 D. G. RENNO 2,791,464
VEHICLE BODY DOOR STRUCTURE
Filed Jan. 4, 1954 4 Sheets-Sheet 3

INVENTOR.
DONALD G. RENNO
BY
*Whittemore, Hulbert & Belknap*
ATTORNEYS

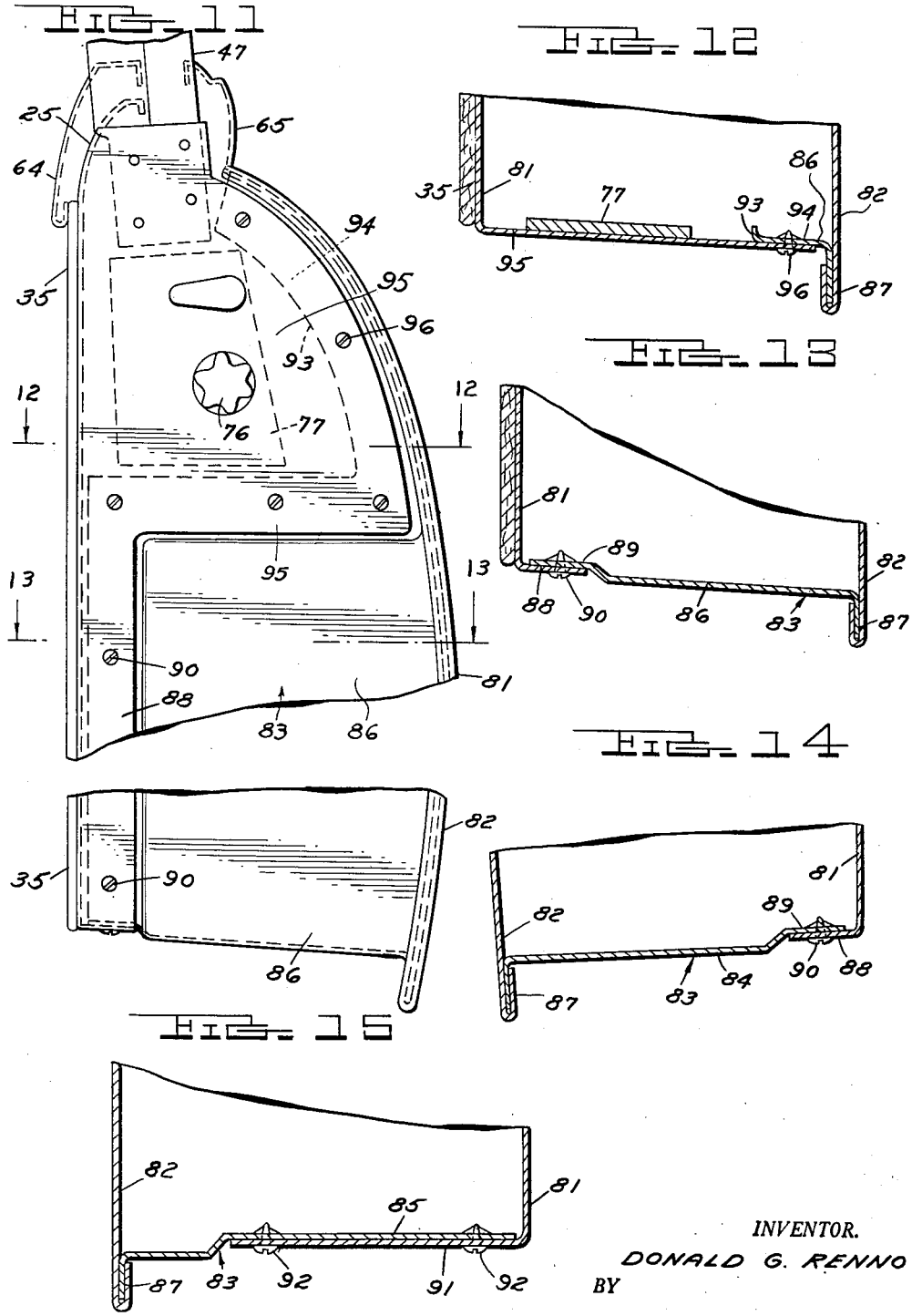

United States Patent Office 2,791,464
Patented May 7, 1957

2,791,464

VEHICLE BODY DOOR STRUCTURE

Donald G. Renno, Birmingham, Mich., assignor to Motor Products Corporation, Detroit, Mich., a corporation of New York Application January 4, 1954, Serial No. 401,948

17 Claims. (Cl. 296—44)

This invention relates generally to vehicle bodies and refers more particularly to improvements in vehicle body door structures.

Vehicle body doors usually comprise an outer panel, an inner panel spaced laterally from the outer panel to provide a window receiving well, a window frame secured to the outer panel, a window assembly in the frame having a panel slidable into and out of the well, a ventilator panel mounted in the frame for swinging movement about a substantially vertically extending axis, regulator mechanism supported within the well to one side of the path of travel of the vertically slidable window panel and connected to the latter for operating the same, operating mechanism for the ventilator panel, a latch assembly for the door, and a remote control for the latch assembly. The above are a few of the essential parts of the door structure which render the latter difficult and expensive to manufacture.

It is an object of this invention to simplify assembly of vehicle body doors of the general type noted above by providing the door structure with a removable inner panel and by mounting the window frame on the removable panel in a manner such that the frame may be installed as a unit with the inner panel.

It is another object of this invention to further simplify assembly of the door structure by mounting the window assembly, regulator mechanism for the vertically slidable window panel, latch mechanism, and remote control for the latch mechanism on the removable inner panel so that all of the foregoing may also be installed as a unit with the inner panel.

A still further object is to provide a package unit of the type described which may be bench assembled as to its component frame, window and operating mechanisms, and in which these parts may be properly and finally adjusted in relation to one another prior to installation of the package on the remainder of the door.

The foregoing as well as other objects will be made more apparent as this description proceeds especially when considered in connection with the accompanying drawings, wherein Figure 1 is a perspective view of a vehicle body door structure showing the inner side of the latter;

Figure 2 is a sectional view taken on the line 2—2 of Figure 1;

Figure 3 is a sectional view taken on the line 3—3 of Figure 1;

Figure 4 is a sectional view taken on the line 4—4 of Figure 1;

Figure 5 is a sectional view taken on the line 5—5 of Figure 1;

Figure 6 is a fragmentary sectional view taken on the line 6—6 of Figure 1;

Figure 7 is a fragmentary elevational view of the rear edge of the vehicle body door structure shown in Figure 1;

Figure 8 is a sectional view taken on the line 8—8 of Figure 7;

Figure 11 is a fragmentary end elevational view of the rear edge of the door;

Figure 12 is a cross sectional view taken on the line 12—12 of Figure 11;

Figure 13 is a cross sectional view taken on the line 13—13 of Figure 11;

Figure 9:
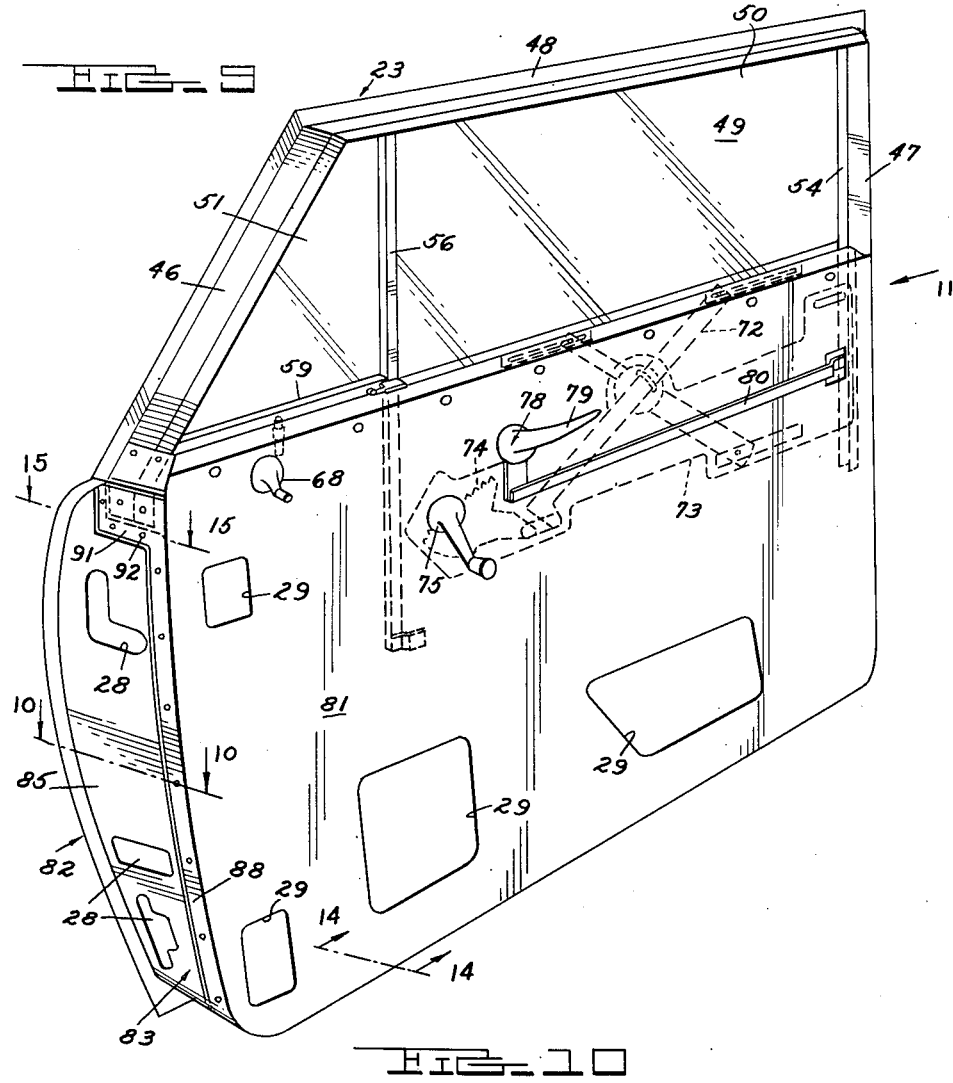
Figure 9 is a perspective view of a modified form of vehicle body door structure and showing the inner side of the door.

Figures 14 and 15 are respectively sectional views taken on the lines 14—14 and 15—15 of Figure 9.

Referring first to the embodiment of the invention shown in Figures 1-8 inclusive, it will be noted that the vehicle body door structure is indicated generally by the numeral 20 and is of the type adapted to be hingedly mounted at its front edge, although it will be apparent from the following description that the present invention is equally applicable to vehicle body door structures regardless of whether the latter are hingedly supported at the front or rear edges. The door structure 20 comprises an outer panel 21, a sectional inner panel 22 and a window frame 23 at the top of the panels. The door panels may be formed of sheet metal, plastics or any sheet material possessing the requisite strength and forming characteristics.

The sectional inner panel 22 comprises a bottom panel section 24 and a top panel section 25. The bottom section 24 has a flange 26 which extends laterally outwardly from the bottom and from the opposite vertical edges of the panel section 24. In accordance with conventional practice, the outer edge of the flange 26 is turned in a laterally outward direction from the flange to provide terminal portions and the adjacent marginal edges of the outer panel 21 are crimped over the terminal portions to form the outer panel 21 with an overlapping reinforced marginal portion 27. In practice, the terminal portion on the flange 26 is welded to the outer panel 21 in order to provide an integral structure. The flange 26 at the front end of the door is formed with clearance openings 28 for accommodating the usual hinges and door check which are not shown herein. Also, the bottom panel section 24 has clearance openings 29 therethrough which are arranged to facilitate assembly of the various parts of the door structure.

As shown in Figure 3 of the drawings, the top edge of the botom panel section 24 is turned laterally outwardly to provide a flange 30 and is then turned upwardly to provide an upstanding marginal flange 31. The top inner panel section 25 is turned laterally outwardly at the bottom edge to provide a flange 32 and is then turned downwardly to provide a marginal flange 33. The marginal flange 33 abuts the inner side of the marginal flange 31 on the bottom panel section 24 and is secured to the flange 31 at spaced points by fastener elements in the form of studs 34. Thus, the top panel section 25 is removably secured to the fixed bottom inner panel section 24 but in effect forms a continuation of the latter and provides a backing for the usual trim panel 35 which covers substantially the entire inner surface of the sectional inner panel 22.

As shown in Figures 1 and 6 of the drawings, the upper end of the flange 26 at the front edge of the door projects upwardly beyond the top edge of the inner panel section 24 and is notched or cut away to form an opening 36 having the bottom edge flush with the adjacent top edge of the inner panel section 24. It will be noted from Figure 6 of the drawings that the flange 26 is turned rearwardly along the marginal edges of the opening 36 to form a flange 37 and is then turned upwardly to provide an attaching flange 38. The flanges 37 and 38 respectively form continuations of the flanges 30 and 31 on the inner panel section 24. The opening 36 is closed by a tab or by an extension 39 which projects outwardly from the front edge of the top panel section 25 and is removably secured to the attaching flange 38 (Figure 6) by detachable fastener elements 40. Thus, the extension or tab 39 forms a continuation of the facing flange 26 at the front edge of the door.

Referring now to Figures 7 and 8 of the drawings, it will be noted that the upper end of the flange 26 at the rear edge of the door is notched or cut away to provide an opening 41. The flange 26 at the marginal edges of the opening 41 is bent forwardly to form flange 42 and is then bent upwardly to form an attaching flange 43. The flanges 42 and 43 respectively form continuations of the flanges 30 and 31 on the bottom inner panel section 24. The opening 41 is closed by a tab or by an extension 44 which projects outwardly from the rear edge of the removable top inner panel section 25 and which is removably secured to the attaching flange 43 by detachable fastener elements 45. It is apparent from the above that the top section 25 of the inner panel 22 is detachable from the bottom section 24 or, in other words, is removable in its entirety from the door structure.

The window frame 23 at the top of the door structure 20 is secured to the top inner door panel section 25 in a manner to enable installing the same as a unit with the top panel section 25. The window frame 23 is shown herein as formed of rolled sections having conventional cross sectional contours, although it will be understood as this description proceeds that the specific form of the frame may be varied to suit any specified design. In the present instance, the window frame 23 comprises a front bar 46, a rear bar 47 and a top bar 48 connecting the upper ends of the end bars. The front bar 46 is inclined upwardly and rearwardly from the top of the flange 26 at the front edge of the door structure and the extension 39 on the removable inner panel section 25 is extended upwardly (Figure 6) to overlie the lower end of the frame bar 46. The overlying portions of the extension 39 and frame bar 46 are riveted, welded or otherwise permanently secured together.

The rear end bar 47 of the frame 23 extends in a vertical direction from the upper end of the flange 26 at the rear edge of the door and the lower end of the frame bar 47 overlies the extension 44 at the rear edge of the removable inner panel section 25. The extension 44 is riveted, welded or otherwise permanently secured to the lower end of the vertical frame bar 47. Thus, it will be seen that the window frame 23 forms a unitary assembly with the removable top section 25 of the inner panel 22.

The opening defined by the frame 23 is adapted to be closed by a window assembly 49 which in the present instance is shown as a conventional ventilator window unit. The window assembly 49 comprises a vertically slidable window panel 50 and a pivoted ventilator panel 51 positioned in the plane of the panel 50 at the front edge of the latter. As shown in Figure 5 of the drawings, the bottom edge of the window panel 50 is provided with a glass retaining channel 52 and the top edge of the window panel 50 is engageable in a header channel 53 which is secured to the top bar 48 of the frame 23. The rear edge of the window panel 50 is engageable with a vertically extending guide channel 54 which is secured to the inner face of the frame bar 47 and projects downwardly into the space or well 55 provided between the outer panel 21 and the inner panel 22. The front edge of the window panel 50 is engageable in a vertically extending guide channel 56 which also forms a division bar between adjacent edges of the two window panels. The upper end of the division bar 56 is secured to the top frame bar 48 and the lower end projects into the well 55 in order to cooperate with the channel 54 to slidably support the panel 50 throughout the extent of its vertical sliding movement. It will also be noted that the lower end of the division bar 56 is secured to the inner door panel section 25 by a bracket 57.

Referring again to Figure 5 of the drawings, it will be noted that the upper edge of the removable inner panel section 25 flares outwardly and coacts with the top edge of the outer panel 21 to provide a slot or access opening 58 through which the panel 50 may slide into and out of the well 55. The vertical guides 54 and 56 extend into the well 55 a sufficient distance to support the window panel 50 in its lowermost position and the vertical height of the removable section 25 of the inner panel 22 in the region of the path of travel of the panel 50 is determined to enable effectively supporting the lower ends of the guides on the outer surface of the removable panel section 25.

The ventilator panel 51 has a glass-retaining channel 59 secured to the front edge thereof (Figure 2) and extending rearwardly along the bottom edge, as shown in Figure 4 of the drawings. In practice, the glass-retaining channel 59 is also extended rearwardly along the top edge of the panel 51 in a manner not shown herein. The portion of the glass-retaining channel 59 at the front edge of the panel 51 is engageable with a weatherstrip 60 anchored on the inner surface of the inclined frame bar 46 and the portion of the glass-retaining channel extending along the top edge of the panel 51 is engaged by a similar weatherstrip which is secured to the top bar 48 of the frame 23. The portion of the glass-retaining channel 59 extending along the bottom edge of the panel 51 is engageable with a length of weatherstripping 61 which is secured to the removable top section 25 of the inner panel 22. As shown in Figure 4 of the drawings, the top edge of the panel section 25 adjacent the ventilator panel 51 is turned laterally outwardly and is then turned upwardly to form a retainer flange 62. The flange 62 extends for substantially the full length of the ventilator window opening and cooperates with a retainer strip 63 on the panel section 25 to secure the length of weatherstripping 61 in place. Garnish molding 64 is secured to the upper portion of the panel section 25 at the inner side of the latter and extends for the full width of the door. The lower edge of the garnish molding 64 overlies the top edge of the trim panel 35 and the top edge of the garnish molding 64 adjacent the ventilator panel 51 abuts a depending leg formed on the weatherstripping 61. Any suitable means, not shown herein, may be provided for clamping the garnish molding 64 to the removable top panel section 25. It will also be noted from Figure 4 that a molding 65 extends for the full width of the door along the top edge of the outer panel 21. The lower edge of the molding 65 is secured to the top edge of the outer panel 21 by fastener elements 66 and the top edge of the molding 65 adjacent the ventilator panel 51 has a bearing engagement with the flange 62. The portions of the moldings 64 and 65 extending rearwardly from the division bar 56 are spaced laterally from each other as shown in Figure 5 of the drawing to afford ample clearance for the vertically slidable panel 50.

In accordance with conventional practice, the ventilator panel 51 is supported for swinging movement about an up and down axis indicated by the numeral 67 in Figure 1 of the drawings. The axis 67 is located between the front and rear edges of the panel 51 and is established by pivot pins respectively supported by the frame 23 and removable top section 25 of the inner panel 22. In the present instance, the panel 51 is swung about the axis 67 by irreversible gearing (not shown) supported on the removable panel section 25 and operated from the inner side of the door by a handle 68. The rear edge of the ventilator window panel 51 is engageable with a vertical abutment 69 (Figure 2) extending forwardly from the inner side of the guide channel 56. A length of weatherstripping 70 is provided on the front side of the channel 56 for engagement with the rear edge of the ventilator panel 51 and a latch 71 (Figure 1) is provided on the bottom portion of the glass-retaining channel 59 for holding the rear swinging edge of the panel 51 in weather-tight engagement with the seal 70. All of the above parts are carried by the removable inner panel section 25 and, hence, may be installed as a unit with the latter.

The vertically slidable panel 50 is operated by regulator mechanism 72 positioned within the window well 55 at the inner side of the path of travel of the panel 50. The regulating mechanism 72 may be of any accepted design and, hence, is not shown in detail herein. As indicated in Figure 1, however, the regulator mechanism selected for the purpose of illustration is of the cross arm type. The upper ends of the arms are respectively slidably connected to the bottom channel 52 on the panel 50 at points spaced from each other lengthwise of the panel 50 and the lower end of one of the arms has a sliding connection with a mounting plate 73 which is welded or otherwise secured to the outer side of the removable inner panel section 25. The lower end of the other arm is connected to a gear segment 74 rotatably supported on the plate 73 in the usual manner and operated by a handle 75 which is accessible from the inner side of the door. As is ordinarily the case, rotation of the handle 75 in opposite directions actuates the cross arms in the appropriate manner to raise and lower the vertically slidable window panel 50. It is apparent that the window regulating mechanism 72 is carried by the removable top section 25 of the inner panel and is capable of installation as a unit with the top section 25.

Referring to Figure 7 of the drawings, the reference numeral 76 indicates a latch assembly of the rotary bolt type. This latch assembly comprises a supporting plate 77 which is secured to the extension 44 of the removable inner panel section 25 and may also be attached to the plate 73. In any case the latch mechanism 76 is carried by the removable inner panel section 25 and in the present instance the remote control mechanism 78 for the latch assembly is also mounted on the removable inner panel section 25. The remote control mechanism 78 comprises a handle 79, accessible for manipulation from the inner side of the door, and linkage 80 operatively connecting the handle to the bolt releasing mechanism of the latch assembly. This specific arrangement forms no part of the present invention and, hence, is not shown in detail herein.

Figure 10:
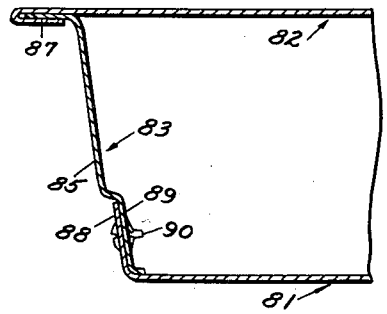
Figure 10 is a sectional view taken on the line 10—10 of Figure 9.

In Figures 9-11 inclusive, a rail type door is shown comprising an inner panel 81, an outer panel 82 and a rail 83 interposed between the panels. The rail 83 comprises a bottom section 84 (Figure 14), a front section 85 (Figures 9 and 10) and a rear section 86 (Figures 11, 12 and 13). These sections are continuous and are turned laterally outwardly at the outer edge to provide a terminal flange 87. The adjacent marginal portions of the outer panel 82 are crimped over the terminal flanges 87 and may be welded to the latter to provide an integral structure.

The inner panel 81 instead of being formed of sections is of one-piece construction and the bottom and end edges thereof are turned outwardly to form marginal flanges 88. The flanges 88 overlie the adjacent portions 89 of the rail 83, and these portions are offset laterally inwardly to provide a recess for receiving the flanges 88. In the present instance the flanges 88 are removably secured to the offset portions 89 of the rail 83 by detachable fastener elements 90.

As shown in Figure 15 of the drawings, the front section 85 of the rail 83 is offset laterally inwardly for substantially its full width and the inner panel 81 is fashioned with an extension or tab 91 which projects outwardly in overlying relationship to the extended offset portion of the rail section 85. The tab 91 corresponds to the tab 39 previously described and is removably secured to the rail 83 by detachable fasteners 92.

As shown in Figure 12 of the drawings, the upper end of the rear rail section 86 is notched or cut away as at 93 providing a marginal flange 94. The inner panel 81 has an extension or tab 95 which projects outwardly in overlying relationship to the cut away portion 93 and is removably secured to the flange 94 by detachable fasteners 96.

With the exception of the foregoing, the door construction shown in Figures 9-15 inclusive may be identical to the embodiment disclosed in Figures 1-8 inclusive and the same reference numerals are used to indicate corresponding parts. It will be noted that the inner panel 81 of the door structure shown in Figures 9-15 inclusive corresponds to the top section 25 of the inner door panel 22 in that it is removably secured to the rail 83 or to the outer panel 82. It will also be noted that in the embodiment of the invention shown in Figures 9-15 inclusive, the door frame 23, window assembly 49, regulator mechanism 72, latch assembly 76, remote control 78 for the latch mechanism, and operating means 68 for the ventilating panel 51 are all mounted on the inner panel 81 and, hence, may be installed as a unit with the inner panel 81. Thus, in both embodiments of the invention selected herein for the purpose of illustration, all or any of the door accessories including the window frame 23 may be installed on the inner door panel 25 in one instance and on the inner door panel 81 in the other instance, to provide in effect a bench assembly capable of being mounted as a unit on the door structure. The window 49 and operating or control mechanisms for the window, as well as those for the door itself and the ventilator panel 51, may be finally and accurately adjusted in operating relation to one another, as well as to the frame 23 and panel 25 or 81, well prior to the installation of this packaged structure to the remainder of the door. This insures much better future operation.

What I claim as my invention is:

1. A vehicle body door having supporting structure comprising an outer panel, an inner panel cooperating with the outer panel to provide a window receiving well and having a top edge portion spaced laterally from the adjacent top edge portion of the outer panel to form a window receiving opening at the top of the well, a flange to which said outer panel is secured, said inner panel having an extension overlying said flange in face to face engagement therewith, means removably securing the inner panel to the door supporting structure at the overlying portions of said flange and said extension, a window frame forming a unitary assembly with the inner panel, said frame having upwardly extending end bars respectively secured at their lower ends to the inner panel and being free from connection to the outer panel, and a top bar connecting the upper ends of the end bars.

2. The vehicle body door defined in claim 1 comprising a vertically slidable window movable from a closed position in said frame to an open position within the window well, vertical guides respectively engageable with the opposite vertical edges of the window, and means respectively securing opposite ends of the guides to the frame and inner door panel.

3. The vehicle body door defined in claim 2 comprising window regulating mechanism housed within the well and mounted on the inner panel, and means operatively connecting the regulating mechanism to the vertically slidable window for raising and lowering the latter.

4. The vehicle body door defined in claim 1 wherein one of said upwardly extending end bars of the frame is secured at its lower end to the extension of said inner panel.

5. The vehicle body door defined in claim 4 comprising a latch assembly mounted on the extension at one end of the door structure.

6. The vehicle body door defined in claim 5 comprising a window panel supported by the frame and movable into and out of the window well, and regulator mechanism mounted on the inner panel and connected to the window panel for operating the latter.

7. A vehicle body door having supporting structure comprising an outer panel, an inner door structure including a bottom inner panel and a removable top inner panel spaced laterally from the outer panel providing a window receiving well between said panels and having a top edge portion spaced laterally from the adjacent top edge portion of the outer panel to provide an entrant opening to said well, outwardly extending end flanges to which said bottom inner panel is integrally connected at opposite ends thereof, said flanges having recessed portions at the top thereof, extensions projecting laterally outwardly from opposite edges of the top inner panel in overlying relationship to said recessed portions and removably attached to said end flanges, a frame forming a window opening at the top of the door and mounted on the top inner panel for installation as a unit with the latter, said frame having upwardly extending end bars respectively secured at their lower ends to the extensions and having a top bar connecting the upper ends of the upwardly extending end bars.

8. The vehicle body door defined in claim 7 comprising a closure for the window opening defined by the frame, said closure having a vertically slidable glass panel and a pivoted ventilator glass panel, guiding means engageable with one vertical edge of the slidable panel including an upwardly extending channel secured to one of the vertical end bars of the frame and extending into the window well, guiding means engageable with the opposite vertical edge of the slidable panel including a vertical channel extending downwardly from the top bar of the frame between adjacent edges of the glass panels into the window well and secured to the inner door structure, and means on the frame and top inner panel for mounting the ventilator panel for swinging movement about an up and down axis.

9. The vehicle body door defined in claim 8 having means supported on the top inner panel for operating said ventilator panel and having regulator mechanism supported on the top inner panel for operating the vertically slidable panel.

10. The vehicle body door defined in claim 9 comprising a latch assembly mounted on one of the extensions of the top inner door panel and a remote control for the latch assembly also mounted on said top inner door panel.

11. A vehicle body door having supporting structure comprising an outer panel, a sectional inner panel spaced laterally from the outer panel providing a window receiving well between said panels and having a top edge portion spaced laterally from the adjacent top edge portion of the outer panel to form an access opening at the top of the window well, said inner panel having a bottom panel section secured to the outer panel and having a top panel section removably secured to the bottom panel section and forming a continuation of the latter, a frame forming a window opening at the top of the door and mounted on the top section of the inner panel for installation as a unit with said top section, said frame having upwardly extending end bars respectively secured at their lower ends to the top panel section and having a top bar connecting the upper ends of said end bars, a window assembly in said frame and having a vertically slidable panel, a pair of vertical guide channels secured to the frame in positions to respectively slidably engage opposite vertical edges of the slidable panel and projecting downwardly into the window well through the opening at the top of said well.

12. The vehicle body door defined in claim 11 wherein one of the guide channels extends along one of the upwardly extending end bars of the frame and wherein the other guide channel is spaced from the other upwardly extending end frame bar, a ventilator window panel located in the space between said other guide channel and said last named end bar of the frame, and means on the frame and top inner panel section for mounting the ventilator panel for swinging movement about an up and down axis.

13. The vehicle body door defined in claim 12, and further comprising means mounted on the top inner panel section for swinging said ventilator panel, and regulator mechanism also mounted on the top inner panel section and connected to the slidable window panel for operating the latter.

14. The vehicle body door defined in claim 11, and further comprising extensions projecting laterally outwardly from opposite edges of the top inner panel section toward the outer door panel and respectively secured to the lower ends of the upwardly extending end bars of the window frame.

15. The vehicle body door defined in claim 14, and further comprising a latch assembly secured to one of the extensions, and a remote control secured to the top inner panel section and connected to said latch assembly for operating the latter.

16. A vehicle body door having supporting structure comprising an outer panel, a sectional inner panel spaced laterally from the outer panel, said inner panel comprising a bottom section secured to the outer panel and a top section removably attached to the bottom section and providing a continuation of the latter, extensions projecting outwardly from opposite edges of the top section toward the outer panel and overlying the adjacent edges of the door structure, a frame forming a window opening at the top of the door and forming a unitary assembly with the top panel section, said frame having upwardly extending end bars having the lower ends respectively secured to the extensions and having a top bar connecting the upper ends of said frame end bars, and vertical window guide channels secured between said end bars, with one of said channels in inwardly spaced relation to an end bar.

17. A vehicle body door having supporting structure comprising an outer panel, an inner panel cooperating with the outer panel to provide a window receiving well and having a top edge portion spaced laterally from the adjacent top edge portion of the outer panel to form a window receiving opening at the top of the well, means removably securing the inner panel to the door supporting structure, a window frame forming a unitary assembly with the inner panel, said frame having upwardly extending end bars respectively secured at their lower ends to the inner panel and being free from connection to the outer panel, a top bar connecting upper ends of the end bars, a vertically slidable window movable from a closed position in said frame to an open position within the window well, vertical guides respectively engageable with the opposite vertical edges of the window, and means respectively securing opposite ends of the guides to the frame and inner door panel.

References Cited in the file of this patent
UNITED STATES PATENTS

| | | |
|---|---|---|
| 2,210,612 | Widman | Aug. 6, 1940 |
| 2,650,857 | Watter | Sept. 1, 1953 |
| 2,658,790 | Fish et al. | Nov. 10, 1953 |